United States Patent [19]
Book et al.

[11] Patent Number: 6,149,960
[45] Date of Patent: Nov. 21, 2000

[54] PROCESS AND FORMULATION FOR A CHEMICALLY LEAVENED DOUGH OR BAKERY PRODUCT

[75] Inventors: Sharon Book, St. Louis, Mo.; Glenn Corliss, Rogers, Minn.; Barbara Heidolph, Wentzville, Mo.

[73] Assignee: Solutia Inc., St. Louis, Mo.

[21] Appl. No.: 09/358,609

[22] Filed: Jul. 21, 1999

Related U.S. Application Data

[60] Provisional application No. 60/094,050, Jul. 24, 1998.
[51] Int. Cl.$^7$ .............................. A21D 8/02; A21D 10/00; A21D 2/02
[52] U.S. Cl. .......................... 426/551; 426/555; 426/562; 426/563; 426/498
[58] Field of Search ................................ 426/562, 563, 426/551, 555, 498

[56] References Cited

U.S. PATENT DOCUMENTS

| | | | |
|---|---|---|---|
| 4,966,782 | 10/1990 | Heidolph et al. | 426/551 |
| 5,409,724 | 4/1995 | Heidolph et al. | 426/562 |
| 5,773,068 | 6/1998 | Heidolph et al. | 426/551 |
| 5,855,945 | 1/1999 | Laughlin et al. | 426/549 |

FOREIGN PATENT DOCUMENTS

WO 98/14064   9/1998   WIPO.

*Primary Examiner*—Nina Bhat
*Attorney, Agent, or Firm*—Gordon F. Sieckmann; Thompson Coburn LLP

[57] ABSTRACT

Chemically leavened bakery product(s) are disclosed which have characteristics similar to bakery product(s) that have been yeast leavened. A process is provided to make such a bakery product without utilizing yeast as the source of carbon dioxide for leavening. Chemically leavened dough is disclosed which may be heated as a fresh dough, or refrigerated or frozen and thereafter heated to prepare a bakery product. Multi-part dry mixes or compositions for preparing such chemically leavened bakery products are disclosed.

81 Claims, No Drawings

PROCESS AND FORMULATION FOR A CHEMICALLY LEAVENED DOUGH OR BAKERY PRODUCT

This application claims the benefit of priority under 35 U.S.C. § 119(c) of U.S. Provisional Application Ser. No. 60/094,050 filed Jul. 24, 1998.

This invention relates to a chemically leavened bakery product such as chemically leavened bread and other related bakery products. More specifically, this invention relates to chemically leavened bread and related bakery products, which are leavened with carbon dioxide from a chemical source such as a carbonate factor. For example, this invention relates to a system using sodium bicarbonate which produces a chemically leavened baked bread having characteristics similar to bread that has been yeast leavened.

This invention also relates to a process to make a chemically leavened bakery product such as chemically leavened bread without utilizing yeast as the source of carbon dioxide for leavening. More specifically, this invention relates to a process, which produces a chemically leavened bakery product without utilizing yeast for leavening, yet achieving characteristics similar to bakery products that have been leavened by yeast.

This invention also relates to a chemically leavened dough which is heated to prepare a chemically leavened bakery product such as bread. More specifically, this invention relates to a chemically leavened dough which produces a chemically leavened bakery product without utilizing yeast as the primary source of carbon dioxide for leavening, yet has characteristics after heating similar to bakery products that have been primarily leavened with yeast. The chemically leavened dough of this invention may be heated as fresh dough, or refrigerated or frozen and thereafter heated to prepare a chemically leavened bakery product.

This invention also relates to a multi-part dry mix useful to make a chemically leavened dough of this invention which comprises at least two parts capable of being usefully combined to thereafter prepare a bakery product of this invention.

BACKGROUND OF THE INVENTION

Conventional bakery products such as breads are made using yeast. As regards to bread, it is believed that yeast serves the important functions of providing loaf volume, crumb texture, and contributes significantly to the flavor. Another benefit from the use of yeast is lowered pH, which increases the shelf life of the bread. The leavening action of yeast depends upon (i) the ability of yeast to generate carbon dioxide and alcohol by breaking down fermentable sugars and upon (ii) the unique ability of the dough matrix to retain the evolved gases.

Consistent quality bakery products are desired. Accordingly, it is desirable to be able to produce consistent bakery products by not utilizing yeast. Productivity in the baking industry would be improved with (i) the elimination of fermentation and (ii) a reduction of proofing times. Thus far, yeast leavened bakery products, of which bread is the largest category, have not been successfully duplicated in a manner that is commercially viable through the use of chemical leavening agents to replace yeast.

Chemical leaveners such as baking powders are presently used without yeast in cakes, muffins, cookies and the like. Generally such conventional chemically leavened products are not made by fermentation and rely on both chemical leavening systems and leavening in the form of air whipped into the batter.

Present baking powders comprise a mixture of sodium bicarbonate or other carbonate source, one or more acid ingredients, and one or more inert ingredients such as starch. A common household baking powder contains sodium aluminum sulfate (SAS or sodium alum), and monocalcium phosphate monohydrate (MCP) to form a so-called "double-acting" type baking powder. The MCP is believed needed to preform the gas cells (i.e., nucleation in the dough or batter). Other double-action type baking powders include but are not limited to combinations of sodium acid pyrophosphate (SAPP), sodium aluminum phosphate (SALP), and MCP.

U.S. patents have issued which relate to leavening systems, doughs, bread and bread making. Such patents show a continuing effort to develop enhanced leavening systems, doughs and breads and enhanced bread making processes. In particular efforts appear to have focused on developing enhanced chemical leavening systems, products made therefrom and enhanced chemically leavened bread making processes. Some of these patents are mentioned below.

U.S. Pat. No. 2,816 which issued Oct. 12, 1842 to Abel Conant relates to a chemical leavening system in a dough wherein tartaric acid, cream of tartar, citric acid, alum, or any other known acid, in a dry state, or any compound of acids, or any compound of which acid or acids are the principal ingredients, in a dry state, whereby the process of this patent comprises mixing the dry acid or acids or the dry compound, in a dry state, with dry flour; and in dissolving saleratus or other alkali in a sufficient quantity of pure water, sweet milk, or other liquid to neutralize the acids in the flour, and make it into dough.

U.S. Pat. No. 6,418 which issued May 1, 1849 to Henry Jones, discloses that fine quality wheat (or other grain from which the flour to be prepared is made) is added to tartaric acid. This is mixed well with the flour and both are passed through a flour dressing machine and allowed to remain untouched for 2–3 days. Afterward the flour and acid are mixed with bicarbonate of soda (or bicarbonate of potassa) in fine powder, muriate of soda, loaf-sugar in fine powder and the whole is thoroughly mixed together and then put through a flour dressing machine.

U.S. Pat. No. 3,060,031 which issued to John H. Moriarty et al. on Oct. 23, 1962, discloses a chemically leavened bread making process using components including an amino acid, sugar based flavor, a GDL and sodium bicarbonate.

U.S. Pat. No. 3,501,314 which issued to Thomas P. Kichline et al. on Mar. 17, 1970, describes a leavening acid which is an alkali metal aluminum acid phosphate (e.g., SALP).

U.S. Pat. No. 3,736,151 which issued to Robert E. Benjamin on Apr. 7, 1981, describes a leavening agent formed from acidic sodium aluminum phosphate in the presence of water and a binder.

GDL was disclosed along with sodium hydrogen carbonate in U.S. Pat. No. 4,741,907 which issued to Toshiaki Furuhashi on May 3, 1988, as ingredients for a multilayer dough system that reportedly keeps the acid and the base separate during mixing and forming. The combination is reportedly reacted in the can.

U.S. Pat. No. 3,096,178, which issued to James W. Tucker on Jul. 2, 1963, ('178 patent) describes a chemically leavened yeast dough in which sodium aluminum phosphate is used with bicarbonate of soda. The '178 patent describes how the sodium aluminum phosphate can be used in excess and how this reportedly imparts desirable characteristics to the yeast bread dough. However contrary to the present invention, this '178 patent utilizes yeast. The '178 patent also describes how proofing can be done at ambient temperature or at an elevated temperature, e.g. 150° F.

U.S. Pat. No. 3,170,795, which issued to Arlee A. Andre on Feb. 23, 1965, ('795 patent) discloses dry mixtures used to produce chemically leavened baked goods, made without yeast, requiring a high-protein flour (having a protein content of at least 18% as measured by the Kjeldahl method) and glucono-δ-lactone (GDL) as the primary leavening acid. The '795 patent describes how optionally a mixture of glucono-δ-lactone (slow-acting acidic leavening agent) with a lesser amount (up to one-third the level of glucono-δ-lactone) of a fast-acting acidic leavening agent including sodium aluminum phosphate can be used. Example 1, of this '795 patent discloses that ingredients are first mixed before the dough is formed by the moisturization of dry ingredients. Optionally, the leavening agents are added late in the mixing cycle of dry ingredients, if a fast-acting acidic agent is used, to preclude as much as possible any premature reaction. This '795 patent does not teach or suggest the importance of any particular order of addition of the bicarbonate during the dough mixing cycle as the inventors have discovered.

Research has been published related to chemically leavened bread. Holmes and Hoseney in two articles (1987, Cereal Chemistry, 64(5):343–348, and 348–351), reported having studied the effect of salts on dough mixing properties and final bread volumes in the first article. According to Holmes and Hoseney, when SALP or MCP were added with yeast, loaf volume decreased compared to yeast alone. The amount of total salt in the loaf as well as the types of ions present were found to be important. The second article dealt with frozen dough. Equal amount of soda and SAS were reportedly added, along with yeast, but this did not benefit loaf volume.

WO 98/14064 and WO 98/14065 each having a Apr. 9, 1998 publication date and each titled Method of Preparing Dough relate to methods of preparing dough compositions and a dough composition formulated from two separate batters. Neither of these published PCT patent applications teach or suggest applicants' invention.

No references appear to disclose or suggest the dough formulation or the particular process of this invention including the chemically leavened bread or the chemically leavened dough of the present invention. Thus despite the past effort in this area to develop enhanced chemical leavening systems, enhanced chemically leavened bread and enhanced chemically leavened dough, there is still a strong continuing need for such enhanced chemical leavening systems which would provide the characteristics of bread prepared from yeast including a reduction in fermentation times and maintain an acceptable desired loaf volume.

OBJECTS OF THE INVENTION

It is an object of the invention to provide a chemically leavened bakery product such as bread and other related bakery products having characteristics similar to yeast leavened bakery products.

It is another object of the invention to provide a process for preparing a chemically leavened bakery product such as bread and other related bakery products.

These and other objects are achieved in this invention which is described more particularly hereinafter.

SUMMARY OF THE INVENTION

The present invention relates to the preparation of chemically leavened bread very similar to conventional yeast-leavened breads such as, for example, a white pan bread but without using yeast as the primary source of leavening gas.

Chemically leavened bread, illustrative of a chemically leavened bakery product of this invention, is made by combining flour, liquid, leavening acids, a carbonate factor and other typical bread ingredients.

The present invention utilizes a mixture of leavening acids, a carbonate factor which includes but is not limited to an alkali metal carbonate, and novel processing conditions to produce a chemically leavened bakery product having characteristics similar to a bakery product that has been yeast leavened.

The novel processing conditions include a specific order that the components of the chemical leavening system of the present invention must be added, the absence of fermentation and reduction of proofing time. More particularly, the carbonate factor must be added late in the dough mixing process and must not be added at the beginning of the dough mixing process with other dry ingredients.

The chemically leavened dough of the present invention can be used to produce any convenient chemically leavened bakery product such as, for example, hamburger buns and wiener rolls; tortillas; gorditas; pretzels; flat-bread; brown-and-serve rolls; bagels; white pan, hearth, whole wheat, and rye bread; enriched bread, rolls, and buns; milk bread, rolls and buns; whole wheat rolls and buns; raisin bread, rolls, and buns; pizza crusts; sweet doughs such as caramel roll type products; doughnuts; Danishes; specialty breads and the like. The chemically leavened dough of the present invention can be used to produce refrigerated dough products as well as frozen dough products that require heating to produce the final product.

This invention also comprises a multi-part dry mix useful to form a chemically leavened dough of this invention which comprises at least two parts capable of being usefully combined, wherein each part comprises a composition, and wherein these compositions collectively comprise an effective amount of a slow release leavening acid, a heat activated leavening acid and a carbonate factor and optionally flour and provided that when flour is employed, then the majority or all of the flour and the majority or all of the carbonate factor are in separate parts.

DETAILED DESCRIPTION OF THE INVENTION

This invention comprises a process for preparing a chemically leavened dough comprising: (a) adding an effective amount of (i) at least one slow release leavening acid and (ii) at least one heat activated leavening acid to dry ingredients or a dough made by mixing a liquid with said dry ingredients and converting said dry ingredients into a dough, wherein said at least one slow release leavening acid and said at least one heat activated leavening acid are added in any order, apart or together, and (b) adding an effective amount of a carbonate factor late in the dough mixing process to prepare the chemically leavened dough of this invention. The chemically leavened dough may be further processed in accordance with this invention to prepare a chemically leavened bakery product of this invention.

In one process embodiment one of the leavening acids may be added to said dry ingredients or said dough and the other of said leavening acids may be added to the dough. In another process embodiment both leavening acids (i) and (ii) may be added to the dough. In yet another process embodiment the first added leavening acid is at least one heat activated leavening acid and said second added leavening acid is at least one slow release leavening acid. In still another process embodiment, the first added leavening acid is at least one slow release leavening acid and the second added leavening acid is at least one heat activated leavening acid.

With regard to the process of preparing a chemically leavened dough or bakery product, mixing and preparation of the dough is carried out by any convenient conventional equipment that is capable of suitable dough development.

One important distinguishing feature of this invention is in the order of addition of the components and the timing of their addition. Other important distinguishing features of this invention include the elimination of fermentation and reduction of proofing time.

In the literature relating to producing chemically leavened bread, the order of addition of components is not regarded as critical. The order of addition of the components of the present invention, however, must be such that the carbonate factor must not be added to the mix at the beginning with other dry ingredients. This is contrary to what is done in other chemically leavened bread applications and provides a surprising advantageous result.

As used herein, the phrase "dry ingredients" refers to a mixture of ingredients such as flour and other ingredients, without any leavening system and which can be used to make a dough. Typically this mix is dry or substantially dry. A leavening system is one whose principal function is to supply carbon dioxide or other leavening gas for leavening. Various flours may be employed in this invention. Those of skill in the art will appreciate that both quality and quantity of protein are important in the selection of the flour and the amount of flour employed.

As used herein, the term "dough" refers to a cohesive blend of the dry ingredients mixture, optionally containing one or more ingredients of a leavening system, with a liquid binder. The liquid binder is typically water although various liquids can be employed herein including liquid sweeteners such as HFCS (high fructose corn syrup), oils such as vegetable oils, mixtures thereof and the like.

As used here, the term "carbonate factor" includes and is not limited to any composition or combination of compositions which acts as a source of carbon dioxide or other leavening gas in a dough system and a bakery product. The terms "carbonate factor" and "soda factor" include but are not limited to carbonate, bicarbonate, soda, mixtures thereof and the like.

As used herein, the term "crumb" includes a slice of bread but excludes the crust of that slice of bread.

The crumb grain of bread is illustrated in Principles of Cereal Science and Technology, $2^{nd}$ Edition, by R. C. Hoseney, American Association of Cereal Chemists, Inc., (AACC) St. Paul, Minn., USA, 1986, 1994 which is incorporated herein in its entirety by reference.

The inventors discovered that adding a combination of SALP and GDL (glucono-δ-lactone or δ-lactone of gluconic acid) early, at or near the beginning of the dough mixing process, while requiring the addition of the sodium bicarbonate later, as an example about half-way or so in the dough mixing process, greatly increased the volume and quality of the crumb of a chemically leavened bakery product.

Accordingly, an embodiment of the present invention is directed to a process as described herein to make a non-yeast leavened dough, i.e., a chemically leavened dough, for bakery products. In a preferred embodiment, a mixture of both leavening acids, at least one heat activated leavening acid and at least one slow release leavening acid, is added with the dry ingredients, followed by addition of the carbonate factor later in the dough mixing process.

As used herein, the term "late" when used in regard to the mixing step is meant as late in elapsed time as practical in the dough mixing process while still achieving uniform mixing within the dough and making a satisfactory bakery product.

The time of mixing the dough is determined by the final consistency and other characteristics of the dough that the baker desires. This information will be readily apparent to those of skill in the art especially after reading this specification. The equipment and ingredients employed will influence the length of mixing time. Once the carbonate factor is added, a baker will want to mix the dough for just enough time to incorporate the carbonate factor so it is evenly or substantially evenly distributed throughout the dough. The length of time of mixing for this to happen will depend to a degree on the equipment used among other variables. The length of time of mixing before the carbonate factor is added to the dough plus the length of time of mixing after the carbonate factor has been added to the dough sums to the total mix time, which is the time that gives the optimum characteristics of the dough as determined by the baker.

In another embodiment of the present invention, one leavening acid is added prior to or at the beginning of the dough mixing process and the other leavening acid is added later with the carbonate factor. In practicing this embodiment, preferably a heat activated leavening acid is added earlier and a slow release leavening acid is added later. However, if desired, a slow release leavening acid may be added as the first leavening acid and a heat activated leavening acid may be added as the second leavening acid. An effective amount of each leavening acid is employed in practicing this invention.

In yet another embodiment of the present invention, both leavening acids are added with the carbonate factor into the dough to form the chemically leavened dough of the present invention. As used throughout this specification and claims, the term "with" means at or about the same time or near in time to.

Optional components such as salt, texture modifiers, shelf life extenders, dough conditioners, sweeteners, shortening, fats, emulsifiers, oils, flavor ingredients, mixtures thereof and the like can be included in the formulation of the present invention if desired and added to the dry ingredients or to the dough. Other additives that can be added are well known to those of ordinary skill in the art of making bread and other bakery products and the like.

A mixture of leavening acids is required in this invention. Specifically, at least one heat activated leavening acid and at least one slow release (or time-release) leavening acid are required.

Any convenient heat activated leavening acid can be used such as, for example, SALP (sodium aluminum phosphate), sodium aluminum sulfate, dimagnesium phosphate, dicalcium phosphate dihydrate, encapsulated acids, and mixtures thereof and the like. It is advantageous to use sodium aluminum phosphate in particular Levn-Lite® (Sodium Aluminum Phosphate as a heat activated leavening acid based on the results obtained therewith. Levn-Lite is a registered trademark of Solutia Inc., 10300 Olive Boulevard P.O. Box 66760, St. Louis, Mo., 63166-6760 for sodium aluminum phosphate.

Glucono-δ-lactone (δ-lactone of gluconic acid or GDL, wherein "δ" is delta) is the preferred slow release leavening acid, although any convenient slow release leavening acid, or some combination of leavening acids, having the slow, gradual release profile of GDL can be used. It is known that GDL hydrolyzes slowly to gluconic acid. The gluconic acid then reacts with the carbonate factor to release the leavening carbon dioxide gas, ($CO_2$). Consequently, GDL causes a slow steady release of $CO_2$ which is a well known property of GDL. Examples of other useful slow release acids that can be used include SAPP, monocalcium phosphate, encapsulated acids, fine granular fumaric acid, mixtures thereof and the like.

Slow release acids that are SAPP are described in Cereal Foods World, Heidolph, Barbara; Vol. 41(3), pages 118–126 (1996) which is incorporated herein by reference in its entirety. Various SAPP's are described therein that have different reactivities and time-release behaviors. Such SAPP's would be useful in practicing this invention. Combinations of different SAPP's can be used to provide the desired effective slow release behavior.

Encapsulated acids are acids that are surrounded with a coating such as, for example, fats, carbohydrates, protein and the like in order to provide a timing function for access to the acid. The timing is determined by the interaction of the encapsulating coating with the environment. As an example, the physical abrasion of the coating can provide access to the acid; thus, the acid would be dormant until an abrasive mixing occurs. As another example, a fat soluble coating would protect the acid until the encapsulated acid is mixed with a fatty component. In another example, the coating melts at a temperature above room temperature in order to provide access to the acid during processing at a temperature elevated from room temperature. In yet another example, a hydrophilic coating would provide access to the encapsulated acid when an aqueous component is encountered by the encapsulated acid. In this invention, any convenient encapsulation can be used that is effective to provide access to the encapsulated acid during processing. Those of skill in the art will recognize after reading this specification that the types and thickness of the coating will determine the time of release.

The carbonate factor is not limited and can be any convenient carbonate useful in conventional leavening applications, with sodium bicarbonate being preferred. Other carbonates useful herein include, illustratively, ammonium bicarbonate, potassium bicarbonate, amorphous calcium carbonate, encapsulated soda, mixtures thereof and the like. The level of carbonate factor should be in the range of about 2 wt. % to about 10 wt. % based on flour. It is preferable to use about 4 wt. % to about 8 wt. % based on flour, and most preferable to use about 4.5 wt. % to about 6.5 wt. % based on flour. The carbonate factor can be any convenient grade such as, for example, grade 1, 2, 3, or 4, or mixtures thereof or any grade that is effective in providing the carbonate factor in a form available for reaction with the acid component. An effective level of carbonate factor is employed in practicing this invention although various amounts may be employed.

The level of carbonate factor dictates the level of each leavening acid component required. The amount of leavening acid necessary is calculated based upon the theoretical neutralizing value for that leavening acid. The amount of heat activated leavening acid is that amount theoretically necessary to neutralize from about 30 wt. % to about 65 wt. %, preferably about 45 wt. % to about 55 wt. %, and most preferably about 50 wt. % of the carbonate factor.

The amount of slow release leavening acid is that amount necessary to theoretically neutralize about (100-X) wt. % of the carbonate factor. The quantity (100-X) is the amount of carbonate factor left after X wt. % of the carbonate factor has been neutralized by heat activated leavening acid.

An additional amount of either heat activated leavening acid, or slow release leavening acid or a combination of such acids can be used if desired. The amount of additional leavening acid is that amount necessary to neutralize a theoretical excess of above 0 wt. % to about 30 wt. % of carbonate factor, preferably about 5 wt. % to about 20 wt. % of carbonate factor. When excess leavening acid is used, it is preferably a slow release leavening acid. In the present invention, it is advantageous to over-neutralize with GDL by adding more GDL than is needed for neutralization of (100-X) wt % of the carbonate factor.

The liquid employed in practicing this invention is preferably water or mostly water. The liquid temperature used in the mixing process of the present invention preferably should be about ambient temperature and more preferably be in the range of from about 18° C. to about 28° C. The liquid temperature should not be elevated above about 28° C. because elevated temperatures could result in decreased bakery product volume. Without being bound by theory, it is believed that the leavening components could disadvantageously react prematurely at elevated temperatures. Accordingly, the temperature should be sufficiently low so as not to cause such premature reaction between the leavening components.

As described above, the present invention utilizes conventional equipment in the bakery process steps to make a satisfactory chemically leavened bakery product of this invention. Thus, the present invention does not require any new equipment for the conventional commercial baker. Similar to conventional bakery product processing, one of skill in the art practicing the present invention blends and mixes the ingredients to make a dough. The dough is formed into appropriately shaped and sized individual product portions. The shaped dough is then proofed. Finally, the proofed dough is heated to provide a bakery product of this invention.

For yeast-leavened products a fermentation step is required because yeast is a living organism which takes time to grow, reproduce, and metabolize sufficiently to produce enough $CO_2$ for leavening. By contrast, the chemically-leavened system of the present invention is a chemical reaction that does not require such a fermentation step. Accordingly, time is saved by omitting the fermentation step. The proofing step of the present invention can be performed at temperatures below about 40° C. The proofing can be advantageously performed at ambient temperatures such as, for example, temperatures in the range of from about 18° C. to about 30° C. The proofing step of the present invention can be performed in a range of humidities such as at a relative humidity in the range of from 0% or about 0% to about 100% but preferably from about 20% to about 75%. In practicing the process of this invention, although a humidity cabinet or a controlled environment cabinet can be used, it is not necessary because ambient relative humidity and temperature are sufficient.

Proofing of the divided dough portions can take varying time for example from about 15 minutes to about 70 minutes. Generally a proofing time up to about 50 minutes provides acceptable results, although the usual proofing is about 15 minutes to about 20 minutes. Depending on temperature and relative humidity, the proofing times will vary.

Also, at higher temperatures, the proofing time can be educed if desired.

Heating of chemically leavened dough made by the process of this invention for a sufficient time to a sufficient temperature to prepare a chemically leavened bakery product of this invention, is carried out under conditions typical for conventional yeast leavened bakery products.

This invention also comprises a multi-part dry mix useful to form a chemically leavened dough of this invention which comprises at least two parts capable of being usefully combined, wherein each part is a composition, and wherein said compositions collectively comprise an effective amount of slow release leavening acid, heat activated leavening acid and carbonate factor and optionally flour and provided that when flour is employ ed that the majority or all of the flour and the majority or all of the carbonate factor are in separate parts.

The present invention includes a preferred embodiment wherein the multi-part dry mix is divided into at least two compositions—one composition of the mix containing the slow release leavening acid and the heat activated leavening acid, and another composition of the mix containing the carbonate factor. If desired, the composition containing the leavening acids may be mixed first to form a dough without a carbonate factor. The other part with a carbonate factor is then added later in the dough to form a chemically leavened dough of this invention.

In a further embodiment, the slow release leavening acid and the heat activated leavening acid can be in separate compositions. It is preferable that the majority of the dry ingredients such as flour (if included) be in the composition (s) containing the acids. If an acid and carbonate factor are in the same composition, then a portion of the flour or an inert ingredient is required to stabilize the system, as is done in baking powders and known to those of skill in the art. The multi-part dry mix is used to make chemically leavened dough as previously described.

One day old Wonder® Bread, (Interstate Brands Corp., 12 East Armor Boulevard, Kansas City, Mo., 64115, U.S.A.) was used as a standard bread herein. Several physical and chemical properties were measured. Among the properties measured were three texture parameters that derive from a texture profile analysis (TPA), which is a technique well known to one of ordinary skill in the art. TPA quantifies the behavior of a cube of bread during and after deformation. This technique produces a graphical curve generally having a group of two or three peaks. Analysis of the peaks yields these three properties:

(i) Springiness—a measure of how well the deformed sample returns to its undeformed condition after the deforming force is removed, calculated as a ratio. Springiness is dimensionless.

(ii) Cohesiveness—a measure of the strength of the internal bonds of the sample, calculated by taking the ratio of the area of the second curve to the area of the first curve. Cohesiveness is dimensionless.

(iii) Hardness—a measure of the force necessary to obtain a given deformation, calculated by determining the height of the first peak if there are only two peaks in the TPA curve, or the height of the second peak if there are three peaks in the TPA curve. Hardness has units of grams.

The specific volume was calculated for the bread. The specific volume is the volume (cubic centimeters measured with a rapeseed volume displacement apparatus) of the baked bread divided by its baked weight (grams) and has the units cc/g.

The calculated properties of the one day old Wonder Bread are shown in Table 1.

TABLE 1

| Attribute | Value |
| --- | --- |
| Weight (g) | 477.9–485.1 |
| Volume (cc) | 2811–2945 |
| Specific Volume (cc/g) | 5.88–6.12 |
| PH | 5.0 |
| Moisture Content (%) | 37.37 |
| Hardness (g) | 39.3–44.1 |
| Cohesiveness | 0.703–0.737 |
| Springiness | 0.827–0.865 |

Sample Preparation

A. Mixing:

Dough samples were made with a 100 gram National Pin Mixer. Following a target dough characteristic guide, an optimum mix time was determined to be about 6.5 minutes for the particular mix equipment with the ingredients used. The prepared dough was acceptably dry and extensible.

When a formulation was made for a test, dry ingredients including the heat activated leavening acid and the slow release leavening acid were weighed, placed in the mixing bowl, and mixed for about one minute. The wet ingredients (water, vegetable oil and HFCS) were added and a timer set for 6.5 minutes. The sodium bicarbonate (carbonate factor) was added as late as possible in the mix to still get uniform incorporation. In general, that time was with about 3 minutes of dough mixing time remaining. The sodium chloride was added with the carbonate factor.

B. Molding:

The dough was formed with the assistance of a sheeter. In these examples, the sheeter was set to 3/16 inch thickness. Each long flattened piece of dough from the sheeter was rolled up and worked between the palms of the operators' hands to force the surfaces together to minimize visibility of roll lines, as would be performed by a mechanical molder. The ends were also worked to form a smooth surface. The formed piece was put in a greased pan.

C. Proofing:

After molding, the dough was proofed in a controlled environment cabinet as per the AACC Approved Method (10-09) that is conventionally used for yeast leavened bread. Conditions were about 32° C. and 75% relative humidity (RH).

D. Baking:

Baking, following conventional practice, was typically done at about 218° C. , for about 20 minutes.

E. Evaluation:

After baking, loaves were allowed to cool, then placed in plastic bags for storage. The next day the loaves were evaluated.

EXAMPLE 1

The components of a formulation illustrative of this invention are shown in Table 2. The ingredients were added at levels based on a flour weight basis.

TABLE 2

| Ingredient | Grams |
| --- | --- |
| Bread flour | 100.00 |
| Water | 62.00 |

TABLE 2-continued

| Ingredient | Grams |
|---|---|
| GDL | 6.50 |
| HFCS | 5.00 |
| Sodium bicarbonate | 4.65 |
| Levn-Lite | 2.52 |
| Vegetable oil | 1.93 |
| Sodium chloride | 1.00 |
| Monoglycerides | 0.50 |
| Sodium stearoyl lactylate | 0.50 |
| Calcium sulfate | 0.30 |

The procedure as described previously was followed. The resultant dough was formed into one loaf of approximately 180 grams. This loaf was proofed in a cabinet for 30 minutes. The proofed loaf was baked at 218° C. for about 18 minutes. The results of characterization tests are shown in Table 3 for the baked loaf made by this formulation.

TABLE 3

| Attribute | Value |
|---|---|
| Volume (cc) | 950 |
| Weight (grams) | 155.13 |
| Hardness (g) | 65.11 |
| Moisture Content (%) | 36.84 |
| Height (cm) | 12.0 |
| Specific Volume (cc/g) | 6.12 |
| Springiness | 0.875 |
| Cohesiveness | 0.645 |

The results show that the formulation produced a bread that was comparable to the target bread.

EXAMPLES 2 AND 3

The formulations for Examples 2 and 3 were the same as Example 1 Table 2. The dough of Example 2 was made via a process similar to that of Example 1. The dough of Example 3 was made by adding the acids later in the dough mixing time, along with the sodium bicarbonate. Examples 2 and 3 were proofed about 15 minutes under room conditions. The measured results for Example 2 and 3 were:

| | Example 2 | Example 3 |
|---|---|---|
| Height (cm) | 11.1 | 9.7 |
| Spec. vol. (cc/g) | 5.5 | 4.8 |
| Hardness (g) | 68.9 | 110.6 |

The results show that, surprisingly, the order of addition of the leavening chemicals has an effect on the properties of the baked product of this invention.

EXAMPLE 4

TABLE 4

| Ingredient | Grams |
|---|---|
| Bread flour | 100 |
| Water | 62 |
| GDL | 6.67 |
| HFCS | 5.0 |
| Sodium bicarbonate | 4.0 |

TABLE 4-continued

| Ingredient | Grams |
|---|---|
| Levn-Lite | 2.16 |
| Vegetable oil | 1.93 |
| Sodium chloride | 1.00 |
| Monoglycerides | 0.50 |
| Sodium stearoyl lactylate | 0.50 |
| Calcium sulfate | 0.30 |

The dough and bread were made following processes similar to those described above for Example 1. Analysis of the resultant bread from the formulation in Table 4, resulted in a specific volume of 5.51 cc/g, a hardness of 71.8 g, a springiness of 0.821, a cohesiveness of 0.637, and a moisture content of 37.91%.

COMPARATIVE EXAMPLE

In this Comparative Example, a yeast-leavened baked bread was prepared which is illustrative of the prior art.

TABLE 5

| Ingredient | Grams |
|---|---|
| Bread Flour | 100 |
| Water | 55.06 |
| Yeast | 2.5 |
| Dough conditioner | 0.51 |
| Sodium stearoyl lactylate | 0.50 |
| Monoglycerides | 0.50 |
| Vegetable oil | 1.93 |
| Sodium chloride | 1.93 |
| Sugar | 6.37 |

The dough conditioner was Arkady® obtained from ADM Arkady, 100 Paniplus Road, Olathe, Kans., 66061. The monoglycerides were Dimodan ® ES K (Danisco Ingredients USA, Inc., 201 New Century Parkway, P.O. Box 26, New Century, Kans., 66031). The flour, vegetable oil, yeast (Fleischmann's Bread Machine Yeast), sodium chloride and sugar were store bought.

Production of the loaf followed AACC Approved Method 10-10B titled "Optimized Straight-Dough Bread-Making Method", with some minor modifications as outlined here. A pin-mixer was used for combining ingredients and dough development. Yeast and water were put in the mixing bowl first and mixed 30 seconds. Dry ingredients (except sodium chloride) and oil were added, and mixing continued for about three minutes. Sodium chloride was added. Mixing was continued for another 3.5 minutes.

The dough was placed in a controlled environment cabinet at 30° C., 85% RH for an 80 minute fermentation time. The dough was punched down using a sheeter with 3/16 inch spacing between the rollers, then placed in the cabinet for an additional 30 minutes. Dough was punched down with a sheeter and fermented another 15 minutes. To form the dough, it was sheeted twice—once at a sheeter roller spacing of 5/16 inch, then once at 3/16 inch. The sheet was rolled by hand to form the loaf shape. Dough was placed in a greased pan for proofing in the same cabinet for 50 minutes (until the dough was approximately 1.5 cm higher than the pan edge). The loaf was baked at 218° C. for 25 minutes. The bread was allowed to cool before being placed in a plastic bag for overnight storage. Evaluation of the loaf was conducted the next day. See Table 6.

TABLE 6

| Attribute | Value |
| --- | --- |
| Weight (g) | 137.20 |
| Volume (cc) | 900 |
| Specific Volume (cc/g) | 6.6 |
| PH | 5.0 |
| Moisture Content (%) | 39.17 |
| Hardness | 97.0 |
| Cohesiveness | 0.67 |
| Springiness | 0.90 |

The present invention has been described in what is considered to represent its preferred embodiment. However, it should be noted that the invention may be practiced otherwise than as specifically illustrated and described without departing from the spirit and scope of the invention.

What is claimed is:

1. A process for preparing a chemically leavened dough comprising:
   (a) adding an effective amount of (i) at least one slow release leavening acid and (ii) at least one heat activated leavening acid to dry ingredients or a dough made by mixing a liquid with said dry ingredients, wherein said at least one slow release leavening acid and said at least one heat activated leavening acid are added in any order, apart or together, and
   (b) adding an effective amount of a carbonate factor late in the dough mixing process to prepare said chemically leavened dough.

2. The process according to claim 1, wherein one of said leavening acids is added to said dry ingredients or said dough and the other of said leavening acids is added to said dough.

3. The process according to claim 1, wherein said leavening acids (i) and (ii) are added to said dough.

4. The process according to claim 2, wherein said first added leavening acid is at least one heat activated leavening acid and said second added leavening acid is at least one slow release leavening acid.

5. The process according to claim 2, wherein said first added leavening acid is at least one slow release leavening acid and said second added leavening acid is at least one heat activated leavening acid.

6. The process according to any one of claims 1–5, wherein said amount of said heat activated leavening acid is that amount necessary to theoretically neutralize about 30 wt. % to about 65 wt % of said carbonate factor.

7. The process according to claim 6, wherein said amount of heat activated leavening acid is that amount necessary to theoretically neutralize about 45 wt. % to about 55 wt % of said carbonate factor.

8. The process according to claim 1, wherein said amount of slow release leavening acid is that amount calculated to theoretically neutralize about (100-X) wt. % of said carbonate factor, wherein the quantity (100-X) is the amount of carbonate factor left after X wt. % of said carbonate factor has been neutralized by said heat activated leavening acid.

9. The process according to claim 1, wherein an additional amount of said heat activated leavening acid, said slow release leavening acid or a combination thereof is employed and is that amount calculated to neutralize a theoretical excess of above 0 wt. % to about 30 wt. % of said carbonate factor.

10. The process according to claim 9, wherein said additional amount is that amount calculated to neutralize a theoretical excess of about 5 wt. % to about 20 wt. % of said carbonate factor.

11. The process according to claim 1, wherein said heat activated leavening acid is selected from sodium aluminum phosphate, sodium aluminum sulfate, dimagnesium phosphate, dicalcium phosphate dihydrate, encapsulated acids or mixtures thereof.

12. The process according to claim 11, wherein said heat activated leavening acid is sodium aluminum phosphate.

13. The process according to claim 1, wherein said slow release leavening acid is selected from glucono-δ-lactone, sodium acid pyrophosphate, monocalcium phosphate, encapsulated acids, fine granular fumaric acid or mixtures thereof.

14. The process according to claim 13, wherein said slow release leavening acid is glucono-δ-lactone.

15. The process according to claim 1, wherein said amount of carbonate factor is in the range of about 2 wt. % to about 10 wt. % based on flour.

16. The process according to claim 15, wherein said amount of carbonate factor is in the range of about 4 wt. % to about 8 wt. % based on flour.

17. The process according to claim 1, wherein said carbonate factor is selected from sodium bicarbonate, potassium bicarbonate, amorphous calcium carbonate or mixtures thereof.

18. The process according to claim 17, wherein said carbonate factor is sodium bicarbonate.

19. The process according to claim 1, wherein said liquid comprises mostly water and is at a temperature at or below about 28° C.

20. The process according to claim 1, wherein said heat activated leavening acid is sodium aluminum phosphate, said slow release leavening acid is glucono-δ-lactone, said carbonate factor is sodium bicarbonate and said liquid comprises water.

21. A chemically leavened dough made by a process comprising:
   (a) adding an effective amount of (i) at least one slow release leavening acid and (ii) at least one heat activated leavening acid to dry ingredients or a dough made by mixing a liquid with said dry ingredients, wherein said at least one slow release leavening acid and said at least one heat activated leavening acid are added in any order, apart or together, and
   (b) adding an effective amount of a carbonate factor late in the dough mixing process to prepare said chemically leavened dough.

22. The chemically leavened dough according to claim 21, wherein one of said leavening acids is added to said dry ingredients or said dough and the other of said leavening acids is added to said dough.

23. The chemically leavened dough according to claim 21, wherein said leavening acids (i) and (ii) are added to said dough.

24. The chemically leavened dough according to claim 22, wherein said first added leavening acid is at least one heat activated leavening acid and said second added leavening acid is at least one slow release leavening acid.

25. The chemically leavened dough according to claim 22, wherein said first added leavening acid is at least one slow release leavening acid and said second added leavening acid is at least one heat activated leavening acid.

26. The chemically leavened dough according to any one of claims 21–25, wherein said amount of said heat activated leavening acid is that amount necessary to theoretically neutralize about 30 wt. % to about 65 wt. % of said carbonate factor.

27. The chemically leavened dough according to claim 26, wherein said amount of said heat activated leavening acid is that amount necessary to theoretically neutralize about 45 wt. % to about 55 wt. % of said carbonate factor.

28. The chemically leavened dough according to claim 21, wherein said amount of slow release leavening acid is that amount calculated to theoretically neutralize about (100-X) wt. % of said carbonate factor, wherein the quantity (100-X) is the amount of said carbonate factor left after X wt. % of said carbonate factor has been neutralized by said heat activated leavening acid.

29. The chemically leavened dough according to claim 21, wherein an additional amount of said heat activated leavening acid, said slow release leavening acid or a combination thereof is employed and is that amount calculated to neutralize a theoretical excess of above 0 wt. % to about 30 wt. % of said carbonate factor.

30. The chemically leavened dough according to claim 29, wherein said additional amount is that amount calculated to neutralize a theoretical excess of about 5 wt. % to about 20 wt. % of said carbonate factor.

31. The chemically leavened dough according to claim 21, wherein said heat activated leavening acid is selected from sodium aluminum phosphate, sodium aluminum sulfate, dimagnesium phosphate, dicalcium phosphate dihydrate, encapsulated acids or mixtures thereof.

32. The chemically leavened dough according to claim 31, wherein said heat activated leavening acid is sodium aluminum phosphate.

33. The chemically leavened dough according to claim 21, wherein said slow release leavening acid is selected from glucono-δ-lactone, sodium acid pyrophosphate, monocalcium phosphate, encapsulated acids, fine granular fumaric acid or mixtures thereof.

34. The chemically leavened dough according to claim 33, wherein said slow release leavening acid is glucono-δ-lactone.

35. The chemically leavened dough according to claim 21, wherein said amount of carbonate factor is in the range of about 2 wt. % to about 10 wt. % based on flour.

36. The chemically leavened dough according to claim 35, wherein said amount of carbonate factor is in the range of about 4 wt. % to about 8 wt. % based on flour.

37. The chemically leavened dough according to claim 21, wherein said carbonate factor is selected from sodium bicarbonate, potassium bicarbonate, amorphous calcium carbonate or mixtures thereof.

38. The chemically leavened dough according to claim 37, wherein said carbonate factor is sodium bicarbonate.

39. The chemically leavened dough according to claim 21, wherein said liquid comprises mostly water and is at a temperature at or below about 28° C.

40. The chemically leavened dough according to claim 21, wherein said heat activated leavening acid is sodium aluminum phosphate, said slow release leavening acid is glucono-δ-lactone, said carbonate factor is sodium bicarbonate and said liquid comprises water.

41. The chemically leavened dough according to any one of claims 21 to 40 wherein said dough is refrigerated or frozen.

42. A chemically leavened bakery product, made by a process comprising:
(a) adding an effective amount of (i) at least one slow release leavening acid and (ii) at least one heat activated leavening acid to dry ingredients or a dough made by mixing a liquid with said dry ingredients, wherein said at least one slow release leavening acid and said at least one heat activated leavening acid are added in any order, apart or together, and (b) adding an effective amount of a carbonate factor late in the dough mixing process to prepare said chemically leavened dough,
(c) forming said chemically leavened dough to prepare a shaped dough,
(d) proofing said shaped dough to prepare a proofed dough and
(e) heating said proofed dough to prepare said chemically leavened bakery product.

43. The chemically leavened bakery product according to claim 42, wherein one of said leavening acids is added to said dry ingredients or said dough and the other of said leavening acids is added to said dough.

44. The chemically leavened bakery product according to claim 42, wherein said leavening acids (i) and (ii) are added to said dough.

45. The chemically leavened bakery product according to claim 43, wherein said first added leavening acid is at least one heat activated leavening acid and said second added leavening acid is at least one slow release leavening acid.

46. The chemically leavened bakery product according to claim 43, wherein said first added leavening acid is at least one slow release leavening acid and said second added leavening acid is at least one heat activated leavening acid.

47. The chemically leavened bakery product according to any one of claims 42 to 46, wherein said amount of said heat activated leavening acid is that amount calculated to theoretically neutralize about 30 wt. % to about 65 wt. % of said carbonate factor.

48. The chemically leavened bakery product according to claim 47, wherein said amount of said heat activated leavening acid is that amount necessary to theoretically neutralize about 45 wt. % to about 55 wt. % of said carbonate factor.

49. The chemically leavened bakery product according to claim 42, wherein said amount of slow release leavening acid is that amount calculated to theoretically neutralize about (100-X) wt. % of said carbonate factor, wherein the quantity (100-X) is the amount of carbonate factor left after X wt. % of said carbonate factor has been neutralized by said heat activated leavening acid.

50. The chemically leavened bakery product according to claim 42, wherein an additional amount of said slow release leavening acid, said heat activated leavening acid or a combination thereof is employed and is that amount calculated to neutralize a theoretical excess of above 0 wt. % to about 30 wt. % of said carbonate factor.

51. The chemically leavened bakery product according to claim 50, wherein said additional amount is that amount calculated to neutralize a theoretical excess of about 5 wt. % to about 20 wt. % of said carbonate factor.

52. The chemically leavened bakery product according to claim 42, wherein said heat activated leavening acid is selected from sodium aluminum phosphate, sodium aluminum sulfate, dimagnesium phosphate, dicalcium phosphate dihydrate, encapsulated acids or mixtures thereof.

53. The chemically leavened bakery product according to claim 52, wherein said heat activated leavening acid is sodium aluminum phosphate.

54. The chemically leavened bakery product according to claim 42, wherein said slow release leavening acid is selected from glucono-δ-lactone, sodium acid pyrophosphate, monocalcium phosphate, encapsulated acids, fine granular fumaric acid or mixtures thereof.

55. The chemically leavened bakery product according to claim 54, wherein said slow release leavening acid is glucono-δ-lactone.

56. The chemically leavened bakery product according to claim 42, wherein said amount of carbonate factor is in the range of about 2 wt. % to about 10 wt. % based on flour.

57. The chemically leavened bakery product according to claim 56, wherein said amount of carbonate factor is in the range of about 4 wt. % to about 8 wt. % based on flour.

58. The chemically leavened bakery product according to claim 42, wherein said carbonate factor is selected from sodium bicarbonate, potassium bicarbonate, amorphous calcium carbonate or mixtures thereof.

59. The chemically leavened bakery product according to claim 58, wherein said carbonate factor is sodium bicarbonate.

60. The chemically leavened bakery product according to claim 42, wherein said liquid comprises mostly water and is at a temperature at or below about 28° C.

61. The chemically leavened bakery product according to claim 42, wherein said proofing is performed at a temperature below about 40° C. and at a relative humidity in the range of from about 20% to about 75%.

62. The chemically leavened bakery product according to claim 42, wherein said heat activated leavening acid is sodium aluminum phosphate, said slow release leavening acid is glucono-δ-lactone, said carbonate factor is sodium bicarbonate and said liquid comprises water.

63. A multi-part dry mix useful to form a chemically leavened dough which comprises at least two parts capable of being usefully combined, wherein each part is a composition, and wherein said compositions collectively comprise an effective amount of a slow release leavening acid, a heat activated leavening acid and a carbonate factor and optionally flour, provided that when flour is employed then the majority or all of the flour and the majority or all of the carbonate factor are in separate parts.

64. The multi-part mix of claim 63, which comprises at least a two part dry mix wherein all or substantially all of leavening acids are in one composition and all or substantially all of said carbonate factor is in another composition of the multi-part mix.

65. The multi-part mix of claim 63, which comprises at least a two part dry mix wherein said dry ingredients are in one composition and said heat activated leavening acid, said slow release leavening acid, said carbonate factor and at least one inert are in said second composition of said multi-part mix.

66. The multi-part mix according to any one of claims 63–65, wherein said amount of said heat activated leavening acid is that amount necessary to theoretically neutralize about 30 wt. % to about 65 wt % of said carbonate factor.

67. The multi-part mix according to claim 66, wherein said amount of said heat activated leavening acid is that amount necessary to theoretically neutralize about 45 wt. % to about 55 wt % of said carbonate factor.

68. The multi part mix according to claims 63–65, wherein said amount of slow release leavening acid is that amount calculated to theoretically neutralize about (100-X) wt. % of said carbonate factor, wherein the quantity (100-X) is the amount of carbonate factor left after X wt. % of said carbonate factor has been neutralized by said heat activated leavening acid.

69. The multi-part mix according to claims 63–65, wherein an additional amount of said heat activated leavening acid, said slow release leavening acid or a combination thereof is employed and is that amount calculated to neutralize a theoretical excess of above 0 wt. % to about 30 wt. % of said carbonate factor.

70. The multi-part mix according to claim 69, wherein said additional amount is that amount calculated to neutralize a theoretical excess of about 5 wt. % to about 20 wt. % of said carbonate factor.

71. The multi-part mix according to claims 63–65, wherein said heat activated leavening acid is selected from sodium aluminum phosphate, sodium aluminum sulfate, dimagnesium phosphate, dicalcium phosphate dihydrate, encapsulated acids or mixtures thereof.

72. The multi-part mix according to claim 71, wherein said heat activated leavening acid is sodium aluminum phosphate.

73. The multi-part mix according to claims 63–65, wherein said slow release leavening acid is selected from glucono-δ-lactone, sodium acid pyrophosphate, monocalcium phosphate, encapsulated acids, fine granular fumaric acid or mixtures thereof.

74. The multi-part mix according to claim 73, wherein said slow release leavening acid is glucono-δ-lactone.

75. The multi-part mix according to claims 63–65, wherein said amount of carbonate factor is in the range of about 2 wt. % to about 10 wt. % based on flour in the final dough.

76. The multi-part mix according to claim 75, wherein said amount of carbonate factor is in the range of about 4 wt. % to about 8 wt. % based on flour in a final dough.

77. The multi-part mix according to claims 63–65, wherein said carbonate factor is selected from sodium bicarbonate, potassium bicarbonate, amorphous calcium carbonate or mixtures thereof.

78. The multi-part mix according claim 77, wherein said carbonate factor is sodium bicarbonate.

79. The multi-part mix according to claims 63–65, wherein said heat activated leavening acid is sodium aluminum phosphate, said slow release leavening acid is glucono-δ-lactone and said carbonate factor is sodium bicarbonate.

80. The chemically leavened bakery product of claim 42, selected from hamburger buns; wiener rolls; tortillas; gorditas; pretzels; flat bread; brown-and-serve rolls; bagels; white pan, hearth, whole wheat, and rye bread; enriched bread, rolls, and buns; milk bread, rolls and buns; whole wheat rolls and buns; raisin bread, rolls, and buns; pizza crusts; sweet doughs; caramel roll type products; doughnuts; Danishes and specialty breads and the like.

81. The chemically leavened bakery product of claim 80, which is a bread.

* * * * *